Patented Aug. 8, 1950

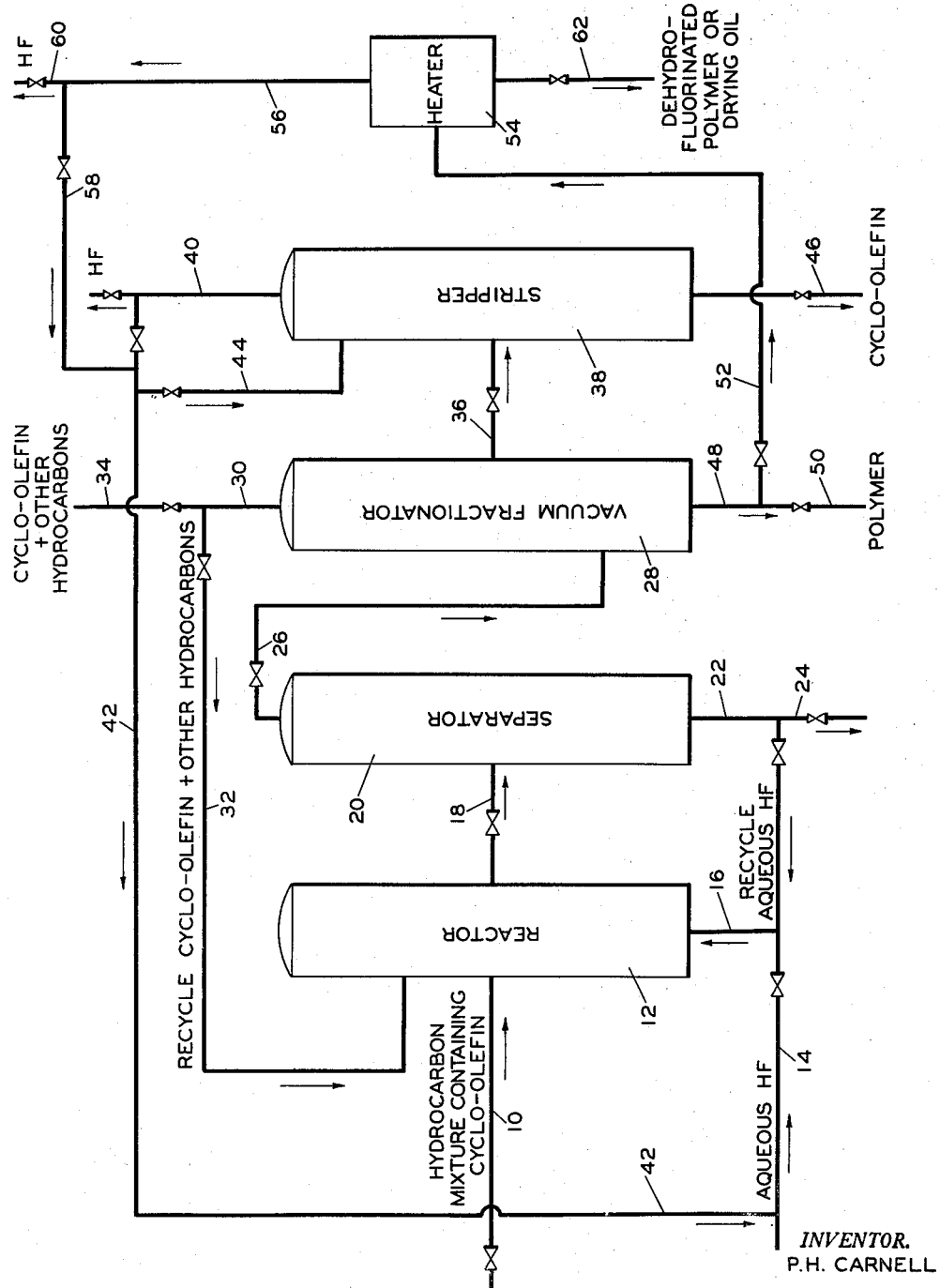

2,517,839

UNITED STATES PATENT OFFICE 2,517,839

RECOVERY OF PURE CYCLO-OLEFINS

Paul H. Carnell, Bartlesville, Okla., assignor to Phillips Petroleum Company, a corporation of Delaware Application May 9, 1947, Serial No. 747,109

15 Claims. (Cl. 260—666)

This invention relates to the recovery of cyclo-olefins. In one embodiment this invention relates to the recovery of a cyclo-olefin from a mixture containing other organic materials. In one specific embodiment this invention relates to the recovery of a low-boiling cycle-olefin, such as cyclo-hexene, from a mixture of hydrocarbons containing the same.

This application is a continuation-in-part of my copending application, Serial No. 671,111, filed June 20, 1946, now Patent 2,498,789, granted February 28, 1950.

Substantially pure cyclo-olefins are becoming more and more important as intermediates in the manufacture of certain chemicals such as cyclic alcohols, aldehydes, and ketones, as well as certain resins, drying oils, and the like. Cyclo-olefins do not occur as such in nature; however, they are found as by-products in certain gas-cracking and oil-cracking operations. They may be made directly by dehydrogenating cycloparaffins, and are also produced by decomposition, at a high temperature, of other hydrocarbons. Usually when cyclo-olefins are made, there are concomitant side reactions forming products which present a problem in recovery and purification of the desired cyclo-olefin due to the similarity of the boiling points, melting points, or chemical characteristics of various hydrocarbons in the mixture. In many cases it is difficult to separate a cyclo-olefin from a corresponding cycloparaffin, and/or other hydrocarbons having closely related boiling points, or from an aliphatic olefin, by fractionation.

Separation of a mixture of materials into its component parts by fractionation is usually satisfactory when the boiling points of the components of the mixture are sufficiently different so that the products may be separated by that method. Sometimes it is desirable to remove one component of a mixture from the mixture; but, due to the similarity of its boiling point with the boiling point of some other component, this cannot be accomplished efficiently by fractionation. Also, certain compounds form azeotropes when they are admixed with each other which makes it very difficult or impossible to separate them by fractionation. This is particularly true of compounds found in petroleum and petroleum products. It is necessary in many cases to take advantage of differences in chemical behavior of the individual components of a mixture in order to effect the desired separation of a mixture into its component parts or to remove one of the compounds from such a mixture. The separation of a cyclo-olefin from its corresponding cycloparaffin, and other hydrocarbons, presents such a problem.

I have found that a cyclo-olefin may be removed from a hydrocarbon mixture containing the same by taking advantage of the chemical activity of the cyclo-olefin with hydrogen fluoride, and particularly with aqueous hydrogen fluoride.

An object of this invention is to recover a substantially pure cyclo-olefin from a mixture with other materials.

Another object of this invention is to recover cyclo-olefins from a mixture with other organic compounds.

Still another object is to recover a cyclo-olefin from a hydrocarbon mixture containing the same where the components of such a mixture have approximately the same boiling point as the cyclo-olefin to be recovered.

Another object is to recover cyclohexene from a mixture of hydrocarbons containing the same.

Other objects and advantages of the present invention will become apparent to those skilled in the art from the accompanying disclosure and description.

According to one embodiment of this invention a substantially pure cyclo-olefin is recovered from a mixture of organic material containing the same by treatment with hydrogen fluoride, and preferably with an aqueous solution of hydrogen fluoride. When an aqueous solution of hydrogen fluoride contacts the mixture of organic material containing a cyclo-olefin, the cyclo-olefin reacts with the hydrogen fluoride contained in the aqueous solution to form a cycloalkyl fluoride. The reaction mixture then separates into an organic layer and an aqueous layer. The organic layer containing the cycloalkyl fluorides is recovered from the aqueous layer and is fractionated, preferably under reduced pressure, to remove the cycloalkyl fluoride therefrom. In this manner the cyclo-olefin is separated from the organic mixture. Thereafter the cycloalkyl fluoride is heated, either with or without the use of a catalyst, to a temperature sufficiently high to dissociate hydrogen fluoride therefrom. The cyclo-olefin so recovered is a substantially pure product, and the hydrogen fluoride may be returned to the process for re-use.

The reaction between aqueous hydrogen fluoride and cyclo-olefin present in the organic mixture is accomplished by contacting the organic material in the liquid phase with the water-hydrogen fluoride mixture in either the liquid or vapor phase at somewhat higher than atmospheric temperature. This reaction step may be carried out in either batchwise or continuous process. If a continuous process is used, it is preferable to pass the aqueous mixture and the organic liquid material countercurrently to each other in a liquid-liquid operation. The temperature of the aqueous solution in such a liquid-liquid operation generally should be as low as practicable for obtaining reaction between the cyclo-olefin and the hydrogen fluoride. This reaction step is preferably effected at a temperature between about 100 and about 400° F., depending upon the particular cyclo-olefin involved and generally at sufficient pressure to maintain the cyclo-olefin in the liquid state. Suitable conditions in any particular instance can be readily found by simple experiments by one skilled in the art in accordance with the present disclosure.

Where it is found particularly suitable, the reaction between the aqueous hydrogen fluoride and the cyclo-olefin may be carried out in the liquid-vapor phase with comparative ease at a temperature where one reactant is maintained in vapor phase.

The concentration of the hydrogen fluoride to be contacted with the cyclo-olefin-hydrocarbon mixture is preferably between 30 and 70 per cent; however, in some cases a lower or higher concentration up to 100 per cent of hydrogen fluoride may be used. In one embodiment small portions of anhydrous hydrogen fluoride may be bled into the reaction chamber containing the cyclo-olefin under such conditions as to effect hydrofluorination with a minimum of polymerization. As a rule, however, acid concentrations above 70 per cent produce an undesirable amount of cyclo-olefin polymer unless the reaction is conducted at low temperatures; acid concentrations below 30 per cent require rather severe reaction conditions for the production of cycloalkyl fluoride. The relative amounts of cyclo-olefin and aqueous hydrogen fluoride are not critical, but the aqueous acid preferably contains hydrogen fluoride in stoichiometric excess of the cyclo-olefin. The contact time for the reaction between the cyclo-olefin and the hydrogen fluoride will vary from about 1 to about 60 minutes or longer. The contact time for such a reaction depends considerably upon the particular cyclo-olefin involved, concentration of hydrogen fluoride and the temperature employed.

The chemical nature of the reaction step of the process in which the cyclo-olefin reacts with the hydrogen fluoride constitutes a chemical interaction between the cyclo-olefin itself and the hydrogen fluoride whereby probably the corresponding cycloalkyl fluoride is formed. At least a molecular equivalent of hydrogen fluoride to cyclo-olefin is used, and preferably the hydrogen fluoride is in excess of the cyclo-olefin present in the organic mixture.

After the organic fluoride has been formed, the entire organic material is charged preferably to a conventional fractional distillation column, and there under appropriate conditions of temperature and pressure the hydrocarbon material is separated from the cycloalkyl fluoride. The hydrocarbons are removed as an overhead fraction from the column and the cycloalkyl fluoride is removed as a bottom product from the column.

The temperature and pressure of the fractionating step will depend upon the particular hydrocarbon mixture treated as the boiling points of the hydrocarbons vary depending upon the number of carbon atoms per molecule; also the boiling point of the cycloalkyl fluoride depends upon the number of carbon atoms in each molecule. It is preferable, in some cases, to use vacuum distillation in order to prevent the use of a temperature so high as to effect dissociation of the cycloalkyl fluoride during the fractionating step. Temperatures between about 50 and about 180° F., depending upon the cycloalkyl fluoride involved, are suitable to make the separation between the hydrocarbon materials and the cycloalkyl fluorides. The cycloalkyl fluorides dissociate into corresponding cyclo-olefins and hydrogen fluoride at elevated temperatures; therefore, in some cases there is a maximum temperature to which the cycloalkyl fluoride can be heated and still avoid dissociation.

After the fractionation step where the cycloalkyl fluoride is separated from the organic mixture, the dissociation of the cycloalkyl fluoride to release hydrogen fluoride is accomplished by charging the cycloalkyl fluoride preferably to a conventional stripping column under conditions of temperature and pressure necessary to decompose the cycloalkyl fluoride. A catalyst, such as, for example, sulfuric acid or added hydrogen fluoride, may be used, if desired, to catalyze the dissociation of hydrogen fluoride from the cycloalkyl fluoride. The hydrogen fluoride formed by dissociation of cycloalkyl fluoride autocatalyzes further dehydrofluorination. The hydrogen fluoride is removed as an overhead fraction from the stripping column and substantially pure cyclo-olefin is removed from near the bottom of the column.

The temperature of the stripping step is relatively higher than the temperature of the reaction step where the cycloalkyl fluoride was produced. Temperatures between about 180 and about 500° F. with the corresponding pressure required to maintain the cyclo-olefin in the liquid phase are generally suitable to decompose the cycloalkyl fluoride into cyclo-olefin and hydrogen fluoride and to liberate hydrogen fluoride therefrom. Some of the cycloalkyl fluorides, for example, cyclopentyl and cyclohexyl fluorides, dissociate at a satisfactory rate at their normal boiling point. It may be preferable to use other temperatures than within this range since ultimately the required temperature for decomposition or stripping depends upon the thermal stability of the cycloalkyl fluoride and the bubble point temperature of the organic mixture in the stripping column.

The process as described in this invention is particularly suited to mixtures in which the hydrocarbons present in addition to the cyclo-olefins are predominantly close-boiling, hydrogen fluoride resistant hydrocarbons such as aromatic compounds, that is, benzene, and/or saturated aliphatic or cyclic compounds, that is, aliphatic hexanes or cyclohexanes. A specific mixture could be one composed of the following compounds:

| | Boiling point, °F. |
|---|---|
| Cyclohexene | 181 |
| Cyclohexane | 178 |
| Benzene | 176 |

Treatment of this mixture with aqueous hydrogen fluoride under the conditions described in this invention yields cyclohexyl fluoride, which has a boiling point of about 212° F., unreacted benzene and cyclohexane. The cyclohexyl fluoride is separated from the benzene and cyclohexane by reduced pressure distillation and is then heated to about 212° F. at atmospheric pressure to yield cyclohexene and hydrogen fluoride.

Any small amount of cyclo-olefin polymer formed by this process may be heated to give hydrogen fluoride and a high-molecular weight drying oil as taught in my copending application, Serial No. 637,266, filed December 26, 1945, now Patent 2,481,498, granted September 13, 1949.

Also, by this invention a substantially pure cyclo-olefin may be recovered from a mixture comprising a cyclo-olefin and an aliphatic olefin. This may be accomplished by taking advantage of the difference in chemical activity of the aliphatic olefin and cyclo-olefin toward aqueous hydrogen fluoride.

I have found that a cyclo-olefin, for example, cyclopentene, reacts with aqueous hydrogen fluoride at moderate temperatures to form cyclopentyl fluoride and that straight-chain olefins, for example, pentene-1, do not react to a great extent under the same conditions. The normal aliphatic olefins, as a rule, react with much more difficulty with aqueous hydrogen fluoride than do cyclo-olefins; however, the iso-aliphatic olefins react more nearly like the cyclo-olefins with aqueous hydrogen fluoride than do the normal aliphatic olefins. Nevertheless, in some cases cyclo-olefins may be separated from the iso-aliphatic olefins by application of this invention.

When aliphatic olefins such as propylene and the butenes are treated with aqueous hydrogen fluoride at elevated temperatures, the respective alkyl fluorides and alcohols are formed. However, when cyclo-olefins such as cyclopentene and cyclohexene are subjected to treatment with aqueous hydrogen fluoride at elevated temperatures, cycloalkyl fluorides are formed which are not hydrolyzed to alcohols by aqueous hydrogen fluoride. In separating cyclo-olefins from aliphatic olefins by use of aqueous hydrogen fluoride, in certain cases both types of alkyl fluorides are formed with substantially equal ease; in such cases, advantage may be taken of the fact that an alkyl fluoride hydrolyzes to an alcohol in the presence of aqueous hydrogen fluoride. The alkyl fluoride may be hydrolyzed to the corresponding alcohol which then may be separated from the cycloalkyl fluoride by fractionation.

The cyclo-olefins which may be recovered in substantially pure form, from admixtures of hydrocarbons containing the same, by this invention include cyclo-olefins containing more than four and less than seven carbon atoms in the ring. However, in its broadest embodiments, this invention is not limited to these specific cyclo-olefins but includes separation and recovery of such cyclo-olefins with saturated side chains, and other cyclo-olefins of higher molecular weight, particularly those having a total of not more than about ten carbon atoms per molecule.

The accompanying drawing is a diagrammatic illustration of apparatus in which an embodiment of this invention my be carried out. A hydrocarbon mixture containing a cyclo-olefin and other hydrocarbons is passed through line 10 to reactor 12 where it is contacted with aqueous hydrogen fluoride. The aqueous hydrogen fluoride is introduced to the reactor through lines 14 and 16. The contact of the acid and hydrocarbon phases within the reactor may be accomplished by jet or mechanical agitation. In cases of multi-stage or packed tower contacting, countercurrent flow of acid and hydrocarbon is preferred. The reaction mixture flows from reactor 12 through line 18 to separator 20 where phase separation takes place. The upper layer is a liquid solution of organic materials. The lower layer, which is chiefly aqueous hydrogen fluoride, is recycled through lines 22 and 16 to reactor 12. A portion of this aqueous solution may be withdrawn from the system through line 24, if desirable. The upper layer from separator 20 flows through line 26 to vacuum fractionator 28 where cycloalkyl fluoride formed in reactor 12 and any polymer that may be present are separated from unreacted cyclo-olefin and other hydrocarbons that may be present. Unreacted cyclo-olefin and other hydrocarbons are recycled from vacuum fractionator 28 through lines 30 and 32 to reactor 12. A portion of the cyclo-olefin and other hydrocarbons withdrawn from the vacuum fractionator 28 may be removed from the system through line 34. Cycloalkyl fluoride passes from vacuum fractionator 28 through line 36 to stripper 38 where sufficient heat is supplied to dissociate and strip hydrogen fluoride from the cycloalkyl fluoride. The dissociated hydrogen fluoride is recycled from stripper 38 through lines 40, 42, 14 and 16 to reactor 12. If desired, a portion of the hydrogen fluoride from stripper 38 may be recycled through lines 40, 42, and 44 to stripper 38 as a reflux and to catalyze the decomposition of the cyclohexyl fluoride. Other catalysts, such as sulfuric acid, as discussed elsewhere herein, may be used in stripper 38. Resulting cyclo-olefin is withdrawn from the bottom of stripper 38 through line 46. Any polymer that is formed in the separation may be withdrawn from vacuum fractionator 28 through lines 48 and 50 and removed from the system, if desired, or passed through lines 48 and 52 to heater 54 where heat is applied to dissociate hydrogen fluoride that may be contained in the polymer, such hydrogen fluoride being recycled from heater 54 through lines 56, 58, 42, 14 and 16 to reactor 12 or withdrawn from the system through line 60. The dehydro-fluorinated polymer or drying oil is withdrawn from heater 54 through line 62.

*Example I*

An 800 ml. bomb or chamber of Monel metal is charged with 225 gm. of 50 per cent aqueous hydrogen fluoride solution and 90 gm. of a hydrocarbon material containing cyclohexene. The bomb is clamped to a platform rocker and is fitted with a suitable pressure gauge. The bomb is slowly heated to a temperature of about 240° F, over a period of about 50 minutes, during which period the contents of the bomb are agitated by rocking. The maximum pressure in the bomb is about 50 p. s. i. g. The bomb is cooled and the contents thereof removed. A liquid organic phase from the bomb, which is separated from the liquid-water phase, is fractionated under reduced pressure, a low-boiling fraction comprising unreacted cyclohexene is removed as overhead product from the fractionating column and cyclohexyl fluoride is removed from the bottom of the still. Cyclohexene has a boiling point of about 181° F. and cyclohexyl fluoride has a boiling point of about 212° F. The cyclohexyl fluoride product from the fractionating tower is distilled at a higher temperature, and is decomposed during the distillation. Free hydrogen fluoride passes overhead during the distillation as a result of this decomposition of the cyclohexyl fluoride, and the hydrogen fluoride is recovered. The kettle product of the distillation comprises purified cyclohexene, which distills below about 212° F., and a small amount of polymer formed during treatment. This polymer, after separation from the cyclo-olefin by distillation, is heated further to liberate any hydrogen fluoride retained in it. The resulting material left after the heating treatment of the polymer is a high molecular weight oil having good drying oil properties useful in paints and varnishes. The exact composition of the drying oil was not determined, but it is highly unsaturated and boils above about 194° F.

*Example II*

About 50 grams of a mixture comprising approximately equimolar proportions of pentene-1 and cyclopentene which have boiling points of about 104 and 113° F., respectively, is contacted with about 100 grams of 40 per cent aqueous hydrogen fluoride in a closed vessel at about 212° F. for 50 minutes. The aqueous layer is separated and discarded. The organic layer is then fractionated at a low pressure to remove pentene-1 and any unreacted cyclopentene as an overhead fraction. The kettle residue, which comprises chiefly cyclopentyl fluoride, is then subjected to extractive distillation at atmospheric pressure, water being used as a selective solvent for the liberated hydrogen fluoride. Substantially acid-free cyclopentene together with some water is obtained overhead. After drying by conventional methods, the cyclopentene is substantially pure.

Inasmuch as the foregoing description comprises preferred embodiments of the invention it is to be understood that the invention should not be unnecessarily limited thereto and that modifications and variations may be made therein without departing from the invention or from the scope of the claims. It is understood that the terms "cyclo-olefin" and "open chain or aliphatic olefin" are intended to be synonymous with "cyclic mono-olefin" and "open chain or aliphatic mono-olefin" respectively, as used in this specification and appended claims.

I claim:

1. A method for the separation of a cyclic mono-olefin from a mixture of straight chain mono-olefin having a similar boiling point as said cyclic mono-olefin, which comprises continuously contacting said mixture containing said cyclic mono-olefin with an aqueous solution of hydrogen fluoride which solution contains between about 30 and about 70 weight per cent of hydrogen fluoride, maintaining a temperature in the range of between about 100 and about 400° F. and sufficient pressure to maintain substantially liquid phase and for a period of time of between about 1 minute and about 60 minutes, maintaining at least a mol ratio of cyclic mono-olefin to hydrogen fluoride such that cycloalkyl fluoride is formed by reaction between said cyclic mono-olefin and hydrogen fluoride, separating a resulting organic solution from a resulting aqueous solution, separating cycloalkyl fluoride contained in said organic solution by fractionation at a temperature within the range of between about 50 and about 180° F., and dissociating hydrogen fluoride from resulting cycloalkyl fluoride by treating at a temperature in the range of between about 200 and 500° F. and at sufficient pressure to substantially prevent the vaporization of the resulting cyclic mono-olefin and recycling at least a portion of the dissociated hydrogen fluoride to the process and recovering a cyclic mono-olefin as a product of the process.

2. A method of separating a cyclic mono-olefin from an aliphatic mono-olefin having the same number of carbon atoms per molecule which comprises contacting a mixture of said olefins with an aqueous mixture of hydrogen fluoride which mixture contains 30 to 70 per cent by weight of hydrogen fluoride at a temperature of 100 to 400° F. whereby a cycloalkyl fluoride is formed and said aliphatic mono-olefin remains unreacted, separating a resulting organic solution from a resulting aqueous mixture, separating said cycloalkyl fluoride from said organic solution by fractionation, removing unreacted aliphatic olefin as a low-boiling fraction, heating a resulting cycloalkyl fluoride under conditions such that hydrogen fluoride is dissociated therefrom and substantially pure cyclic mono-olefin is recovered.

3. A method for the separation of a cyclic mono-olefin from a mixture of paraffins and open chain mono-olefins having substantially the same boiling point as said cyclic mono-olefin which comprises contacting said mixture containing said cyclic mono-olefin having more than four and less than seven carbon atoms in the ring with an aqueous solution of hydrogen fluoride which solution contains 30 to 70 weight per cent of hydrogen fluoride at a temperature of 100 to 400° F. whereby the corresponding cycloalkyl fluoride is formed, separating a resulting organic solution from a resulting aqueous mixture, separating resulting cycloalkyl fluoride from said organic solution by fractionation and heating said resulting cycloalkyl fluoride under conditions and in the presence of a catalyst such that hydrogen fluoride is dissociated therefrom, and recovering resulting cyclic mono-olefin as a product of the process.

4. A method for the separation of a cyclic mono-olefin having more than four and less than seven carbon atoms in the ring from a mixture comprising paraffin hydrocarbons having a similar boiling point as said cyclic mono-olefin, which comprises continuously contacting said mixture of paraffin hydrocarbons containing said cyclic mono-olefin with an aqueous solution of hydrogen fluoride which solution contains between about 30 and about 70 weight per cent of hydrogen fluoride, maintaining a temperature in the range of between about 100 and about 400° F. and sufficient pressure to maintain substantially liquid phase and for a period of time of between about 1 minute and about 60 minutes, maintaining at least a mol ratio of cyclic mono-olefin to hydrogen fluoride such that cycloalkyl fluoride is formed by reaction between said cyclic mono-olefin and hydrogen fluoride, separating a resulting organic solution from a resulting aqueous solution, separating cycloalkyl fluoride contained in said organic solution by fractionation at a temperature within the range of between about 50 and about 180° F., and dissociating hydrogen fluoride from resulting cycloalkyl fluoride by treating said cycloalkyl fluoride at a temperature in the range of between about 200 and 500° F. and at sufficient pressure to substantially prevent the vaporization of the resulting cyclic mono-olefin and recycling at least a portion of the dissociated hydrogen fluoride to the process and recovering a cyclic mono-olefin as a product of the process.

5. A method for the separation of cyclohexene from a hydrocarbon mixture comprising open chain mono-olefins, cycloparaffins and paraffins having a similar boiling point as cyclohexene, which comprises continuously contacting said mixture containing cyclohexene with an aqueous solution of hydrogen fluoride which solution contains between about 30 and about 70 weight per cent of hydrogen fluoride, maintaining a temperature in the range of between about 100 and about 400° F.

and sufficient pressure to maintain substantially liquid phase and for a period of time of between about 1 minute and about 60 minutes, maintaining at least a mol ratio of cyclohexene to hydrogen fluoride such that cyclohexyl fluoride is formed by reaction between said cyclohexene and hydrogen fluoride, separating a resulting organic solution from a resulting aqueous solution, separating cyclohexyl fluoride contained in said organic solution by fractionation at a temperature within the range of between about 50 and about 180° F., and dissociating hydrogen fluoride from resulting cyclohexyl fluoride by treating said cyclohexyl fluoride at a temperature in the range of between about 200 and 500° F. and at a sufficient pressure to substantially prevent the vaporization of the resulting cyclohexene and recycling at least a portion of the dissociated hydrogen fluoride to the process and recovering cyclohexene as a product of the process.

6. A method for the separation of cyclopentene from a hydrocarbon mixture comprising open chain mono-olefins, cycloparaffins and paraffins having a similar boiling point as said cyclopentene, which comprises continuously contacting said mixture containing cyclopentene with an aqueous solution of hydrogen fluoride which solution contains between about 30 and about 70 weight per cent of hydrogen fluoride, maintaining a temperature in the range of between about 100 and about 400° F. and sufficient pressure to maintain substantially liquid phase and for a period of time of between about 1 minute and about 60 minutes, maintaining at least a mol ratio of cyclopentene to hydrogen fluoride such that cyclopentyl fluoride is formed by reaction between said cyclopentene and hydrogen fluoride, separating a resulting organic solution from a resulting aqueous solution, separating cyclopentyl fluoride contained in said organic solution by fractionation at a temperature within the range of between about 50 and about 180° F., and dissociating hydrogen fluoride from resulting cyclopentyl fluoride by treating at a temperature in the range of between about 200 and 500° F. and at sufficient pressure to substantially prevent the vaporization of the resulting cyclopentene and recycling the dissociated hydrogen fluoride to the process and recovering cyclopentene as a product of the process.

7. A method for the separation of cyclopentene from a mixture comprising pentene-1 and cyclopentene, which comprises continuously contacting said mixture with an aqueous solution of hydrogen fluoride which solution contains between about 30 and about 70 weight per cent of hydrogen fluoride, maintaining a temperature in the range of between about 100 and about 400° F. and sufficient pressure to maintain substantially liquid phase and for a period of time of between about 1 minute and about 60 minutes, maintaining at least a mol ratio of cyclopentene to hydrogen fluoride such that cyclopentyl fluoride is formed by reaction between said cyclopentene and hydrogen fluoride, separating a resulting organic solution from a resulting aqueous solution, separating cyclopentyl fluoride contained in said organic solution by fractionation at a temperature within the range of between about 50 and about 180° F., and dissociating hydrogen fluoride from resulting cyclopentyl fluoride by treating said cyclopentyl fluoride at a temperature in the range of between about 200 and 500° F. and at sufficient pressure to substantially prevent the vaporization of the resulting cyclopentene and recycling at least a portion of the dissociated hydrogen fluoride to the process and recovering cyclopentene as a product of the process.

8. A method for the separation of cyclohexene from a mixture comprising cyclohexene, cyclohexane and benzene, which comprises continuously contacting said mixture with an aqueous solution of hydrogen fluoride which solution contains between about 30 and about 70 weight per cent of hydrogen fluoride, maintaining a temperature in the range of between about 100 and about 400° F. and sufficient pressure to maintain substantially liquid phase and for a period of time of between about 1 minute and about 60 minutes, maintaining at least a mol ratio of cyclohexene to hydrogen fluoride such that cyclohexyl fluoride is formed by reaction between said cyclohexene and hydrogen fluoride, separating a resulting organic solution from a resulting aqueous solution, separating cyclohexyl fluoride contained in said organic solution by fractionation at a temperature within the range of between about 50 and about 180° F., and dissociating hydrogen fluoride from resulting cyclohexyl fluoride by treating said cyclohexyl fluoride at a temperature in the range of between about 200 and 500° F. and at sufficient pressure to substantially prevent the vaporization of the resulting cyclohexene and recycling at least a portion of the dissociated hydrogen fluoride to the process and recovering cyclohexene as a product of the process.

9. A method for the separation of a cyclic mono-olefin from a mixture comprising said cyclic mono-olefin and open chain mono-olefins having substantially the same boiling point as said cyclic mono-olefin, which comprises contacting such a mixture containing a cyclic mono-olefin having more than 4 and less than 7 carbon atoms in the ring with an aqueous solution of hydrogen fluoride, which solution contains between 30 and 70 weight per cent of hydrogen fluoride, at a temperature in the range of 100 to 400° F. whereby the corresponding cycloalkyl fluoride is formed, separating a resulting organic solution from a resulting aqueous mixture, separating a resulting cycloalkyl fluoride from said organic solution by fractional distillation, heating said resulting cycloalkyl fluoride under conditions such that hydrogen fluoride is dissociated therefrom, and recovering the resulting cyclic mono-olefin as a product of the process.

10. The method of claim 9 in which said cyclic mono-olefin is cyclohexene.

11. The method of claim 9 in which said cyclic mono-olefin is cyclopentene.

12. The method of claim 9 in which said cyclic mono-olefin has not more than ten carbon atoms per molecule.

13. A method for the separation of cyclohexene from a mixture comprising cyclohexene and benzene, which comprises continuously contacting said mixture with an aqueous solution of hydrogen fluoride which solution contains between 30 and 70 weight per cent of hydrogen fluoride, maintaining a temperature in the range of between 100 and 400° F. and sufficient pressure to maintain substantially liquid phase and for a period of time of between 1 minute and 60 minutes, maintaining at least a mol ratio of cyclohexene to hydrogen fluoride such that cyclohexyl fluoride is formed by reaction between said cyclohexene and hydrogen fluoride, separating a resulting organic solution from a resulting aqueous solution, separating cyclohexyl fluoride contained in said organic solution by fractionation at a temperature within the range of between 50 and 180° F., and dissociating hydrogen fluoride from resulting cyclohexyl fluoride by treating said cyclohexyl fluoride at a temperature in the range of between 200 and 500° F. and at sufficient pressure to substantially prevent the vaporization of the resulting cyclohexene and recycling at least a portion of the dissociated hydrogen fluoride to the process and recovering cyclohexene as a product of the process.

14. A method for the separation of cyclohexene from a mixture comprising cyclohexene and cyclohexane, which comprises continuously contacting said mixture with an aqueous solution of hydrogen fluoride which solution contains between 30 and 70 weight per cent of hydrogen fluoride, maintaining a temperature in the range of between 100 and 400° F. and sufficient pressure to maintain substantially liquid phase and for a period of time of between 1 minute and 60 minutes, maintaining at least a mol ratio of cyclohexene to hydrogen fluoride such that cyclohexyl fluoride is formed by reaction between said cyclohexene and hydrogen fluoride, separating a resulting organic solution from a resulting aqueous solution, separating cyclohexyl fluoride contained in said organic solution by fractionation at a temperature within the range of between 50 and 180° F., and dissociating hydrogen fluoride from resulting cyclohexyl fluoride by treating said cyclohexyl fluoride at a temperature in the range of between 200 and 500° F. and at sufficient pressure to substantially prevent the vaporization of the resulting cyclohexene and recycling at least a portion of the dissociated hydrogen fluoride to the process and recovering cyclohexene as a product of the process.

15. A method for the separation of cyclopentene from a mixture comprising a straight chain pentene and cyclopentene, which comprises continuously contacting said mixture with an aqueous solution of hydrogen fluoride which solution contains between 30 and 70 weight per cent of hydrogen fluoride, maintaining a temperature in the range of between 100 and 400° F. and sufficient pressure to maintain substantially liquid phase and for a period of time of between 1 minute and 60 minutes, maintaining at least a mol ratio of cyclopentene to hydrogen fluoride such that cyclopentyl fluoride is formed by reaction between said cyclopentene and hydrogen fluoride, separating a resulting organic solution from a resulting aqueous solution, separating cyclopentyl fluoride contained in said organic solution by fractionation at a temperature within the range of between 50 and 180° F., and dissociating hydrogen fluoride from resulting cyclopentyl fluoride by treating said cyclopentyl fluoride at a temperature in the range of between 200 and 500° F. and at sufficient pressure to substantially prevent the vaporization of the resulting cyclopentene and recycling at least a portion of the dissociated hydrogen fluoride to the process and recovering cyclopentene as a product of the process.

PAUL H. CARNELL.

REFERENCES CITED

The following references are of record in the file of this patent:

UNITED STATES PATENTS

| Number | Name | Date |
|---|---|---|
| 2,220,173 | Grosse et al. | Nov. 5, 1940 |
| 2,368,446 | Buc | Jan. 30, 1945 |
| 2,386,333 | Morris | Oct. 9, 1945 |
| 2,386,334 | Morris | Oct. 9, 1945 |

OTHER REFERENCES

Grosse et al.: Journal of Organic Chemistry, vol. 3, pages 26–32 (1938).

Swarts: Bull. sci. acad. roy. Belgique, vol. 22, pages 105–121 (1936) (Abstracted in Chemical Abstracts, vol. 30, 4153–4 (1936)).

McElvain et al.: Journal of American Chemical Society, vol. 66 (1944), pages 1759–64.